US008334788B2

(12) United States Patent
Hausler et al.

(10) Patent No.: US 8,334,788 B2
(45) Date of Patent: Dec. 18, 2012

(54) PROCESS VARIABLE TRANSMITTER WITH DISPLAY

(75) Inventors: George C. Hausler, Maple Grove, MN (US); Steven J. McCoy, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 394 days.

(21) Appl. No.: 12/717,290

(22) Filed: Mar. 4, 2010

(65) Prior Publication Data

US 2011/0215944 A1 Sep. 8, 2011

(51) Int. Cl.
G08B 23/00 (2006.01)
G08C 15/06 (2006.01)
(52) U.S. Cl. .............. 340/870.02; 340/870.01
(58) Field of Classification Search ............. 340/870.16, 340/870.02, 870.01; 345/156; 73/156
See application file for complete search history.

(56) References Cited

U.S. PATENT DOCUMENTS

| 524,752 | A | 8/1894 | Bohm |
|---|---|---|---|
| 1,171,715 | A | 2/1916 | Griffith et al. |
| 2,818,560 | A | 12/1957 | Edrich |
| 3,698,122 | A | 10/1972 | Adams |
| 3,701,280 | A | 10/1972 | Stroman |
| 3,943,500 | A | 3/1976 | Buchanan |
| 3,968,694 | A | 7/1976 | Clark |
| 4,094,083 | A | 6/1978 | Fund |
| 4,106,229 | A | 8/1978 | Schmid |
| 4,120,206 | A | 10/1978 | Rud, Jr. |
| 4,125,027 | A | 11/1978 | Clark |
| 4,184,153 | A | 1/1980 | Glaubitz |
| 4,238,825 | A | 12/1980 | Geery |
| 4,250,490 | A | 2/1981 | Dahlke |
| 4,287,501 | A | 9/1981 | Tominaga et al. |
| 4,308,527 | A | 12/1981 | Moreau et al. |
| 4,377,809 | A | 3/1983 | Lawford |
| 4,414,634 | A | 11/1983 | Louis et al. |
| 4,419,898 | A | 12/1983 | Zanker et al. |
| 4,446,730 | A | 5/1984 | Smith |

(Continued)

FOREIGN PATENT DOCUMENTS

CN 1678887 A 10/2005

(Continued)

OTHER PUBLICATIONS

"Notification of Transmittal of the International Search Report and The Written Opinion of the International Searching Authority, or the Declaration", PCT/US2001/025998 filed Feb. 24, 2011; date of mailing May 19, 2011; 9 pages.

(Continued)

Primary Examiner — Peguy Jean Pierre
(74) Attorney, Agent, or Firm — Westman, Champlin & Kelly, P.A.

(57) ABSTRACT

A process variable transmitter for use in measuring a process variable of an industrial process includes a display. The transmitter comprises a housing, a process variable sensor configured to sense the process variable of the industrial process, transmitter circuitry coupled to the process variable sensor configured to provide a transmitter output and a connection member in the housing configured to couple to the transmitter circuitry. A first rotatable connector on the connection member includes a plurality of first conductors. A module includes a second rotatable connector having a plurality of second conductors. The plurality of first and second conductors are configured to electrically connect together.

16 Claims, 4 Drawing Sheets

U.S. PATENT DOCUMENTS

| | | |
|---|---|---|
| 4,455,875 A | 6/1984 | Guimard et al. |
| 4,485,673 A | 12/1984 | Stern |
| 4,528,855 A | 7/1985 | Singh |
| 4,562,744 A | 1/1986 | Hall et al. |
| 4,598,381 A | 7/1986 | Cucci |
| 4,602,344 A | 7/1986 | Ferretti et al. |
| 4,617,607 A | 10/1986 | Park et al. |
| D287,827 S | 1/1987 | Broden |
| 4,644,797 A | 2/1987 | Ichikawa et al. |
| 4,653,330 A | 3/1987 | Hedtke |
| 4,677,841 A | 7/1987 | Kennedy |
| 4,745,810 A | 5/1988 | Pierce et al. |
| D296,995 S | 8/1988 | Lee |
| D297,314 S | 8/1988 | Hedtke |
| D297,315 S | 8/1988 | Pierce et al. |
| 4,783,659 A | 11/1988 | Frick |
| 4,791,352 A | 12/1988 | Frick et al. |
| 4,798,089 A | 1/1989 | Frick et al. |
| 4,801,918 A | 1/1989 | Buckingham et al. |
| 4,809,550 A | 3/1989 | Faulconer |
| 4,818,994 A | 4/1989 | Orth et al. |
| 4,825,704 A | 5/1989 | Aoshima et al. |
| 4,833,922 A | 5/1989 | Frick et al. |
| 4,850,227 A | 7/1989 | Luettgen et al. |
| 4,866,989 A | 9/1989 | Lawless |
| 4,881,412 A | 11/1989 | Northedge |
| 4,893,903 A | 1/1990 | Thaker et al. |
| 4,906,971 A | 3/1990 | Schmid et al. |
| 4,926,572 A | 5/1990 | Holmes |
| 4,930,353 A | 6/1990 | Kato et al. |
| 4,958,938 A | 9/1990 | Schwartz et al. |
| 4,970,898 A | 11/1990 | Walish et al. |
| 4,980,675 A | 12/1990 | Meisenheimer, Jr. |
| 5,000,047 A | 3/1991 | Kato et al. |
| D317,266 S | 6/1991 | Broden et al. |
| D317,269 S | 6/1991 | Selg |
| D318,432 S | 7/1991 | Broden et al. |
| 5,028,746 A | 7/1991 | Petrich |
| 5,035,140 A | 7/1991 | Daniels et al. |
| 5,046,616 A | 9/1991 | Makowski et al. |
| 5,051,937 A | 9/1991 | Kawate et al. |
| 5,058,437 A | 10/1991 | Chaumont et al. |
| 5,060,108 A | 10/1991 | Baker et al. |
| 5,070,732 A | 12/1991 | Duncan et al. |
| 5,083,091 A | 1/1992 | Frick et al. |
| 5,087,871 A | 2/1992 | Losel |
| 5,094,109 A | 3/1992 | Dean et al. |
| 5,136,516 A | 8/1992 | Twombly |
| D329,619 S | 9/1992 | Cartwright |
| 5,142,914 A | 9/1992 | Kusakabe et al. |
| 5,157,972 A | 10/1992 | Broden et al. |
| 5,162,725 A | 11/1992 | Hodson et al. |
| 5,184,064 A | 2/1993 | Vicknair et al. |
| 5,187,474 A | 2/1993 | Kielb et al. |
| 5,212,645 A | 5/1993 | Wildes et al. |
| 5,227,782 A | 7/1993 | Nelson |
| 5,236,202 A | 8/1993 | Krouth et al. |
| 5,245,333 A | 9/1993 | Anderson et al. |
| 5,248,167 A | 9/1993 | Petrich et al. |
| D342,456 S | 12/1993 | Miller et al. |
| 5,276,631 A | 1/1994 | Popovic et al. |
| 5,287,746 A | 2/1994 | Broden |
| 5,353,200 A | 10/1994 | Bodin et al. |
| 5,369,386 A | 11/1994 | Alden et al. |
| 5,377,547 A | 1/1995 | Kusakabe et al. |
| 5,381,355 A | 1/1995 | Birangi et al. |
| D358,784 S | 5/1995 | Templin, Jr. et al. |
| 5,436,824 A | 7/1995 | Royner et al. |
| 5,448,180 A | 9/1995 | Kienzler et al. |
| 5,469,150 A | 11/1995 | Sitte |
| 5,471,885 A | 12/1995 | Wagner |
| D366,000 S | 1/1996 | Karas et al. |
| D366,218 S | 1/1996 | Price et al. |
| 5,495,768 A | 3/1996 | Louwagie et al. |
| 5,498,079 A | 3/1996 | Price |
| 5,502,659 A | 3/1996 | Braster et al. |
| 5,524,333 A | 6/1996 | Hogue et al. |
| 5,524,492 A | 6/1996 | Frick et al. |
| 5,546,804 A | 8/1996 | Johnson et al. |
| 5,554,809 A | 9/1996 | Tobita et al. |
| 5,600,782 A | 2/1997 | Thomson |
| 5,603,025 A | 2/1997 | Tabb et al. |
| 5,606,513 A | 2/1997 | Louwagie et al. |
| 5,613,025 A | 3/1997 | Grois et al. |
| 5,650,936 A | 7/1997 | Loucks et al. |
| 5,656,782 A | 8/1997 | Powell, II et al. |
| 5,665,899 A | 9/1997 | Willcox |
| 5,668,322 A | 9/1997 | Broden |
| 5,669,713 A | 9/1997 | Schwartz et al. |
| 5,670,722 A | 9/1997 | Moser et al. |
| 5,677,476 A | 10/1997 | McCarthy et al. |
| 5,710,552 A | 1/1998 | McCoy et al. |
| 5,754,596 A | 5/1998 | Bischoff et al. |
| 5,764,928 A | 6/1998 | Lancott |
| 5,819,455 A | 10/1998 | Tsuda |
| 5,823,228 A | 10/1998 | Chou |
| 5,870,695 A | 2/1999 | Brown et al. |
| 5,884,284 A | 3/1999 | Peters et al. |
| 5,899,962 A | 5/1999 | Louwagie et al. |
| 5,920,016 A | 7/1999 | Broden |
| 5,948,988 A | 9/1999 | Bodin |
| 5,954,526 A | 9/1999 | Smith |
| 5,955,684 A | 9/1999 | Gravel et al. |
| 5,973,942 A | 10/1999 | Nelson et al. |
| 5,983,727 A | 11/1999 | Wellman et al. |
| 5,988,203 A | 11/1999 | Hutton |
| 5,995,946 A | 11/1999 | Auzenne et al. |
| 6,002,996 A | 12/1999 | Burks et al. |
| 6,005,500 A | 12/1999 | Goboury et al. |
| 6,006,338 A | 12/1999 | Longsdorf et al. |
| 6,013,108 A | 1/2000 | Karolys et al. |
| 6,035,240 A | 3/2000 | Moorehead et al. |
| 6,038,927 A | 3/2000 | Karas |
| 6,047,219 A | 4/2000 | Eidson |
| 6,047,268 A | 4/2000 | Bartoli et al. |
| 6,050,145 A | 4/2000 | Olson et al. |
| 6,052,671 A | 4/2000 | Crooks et al. |
| 6,058,441 A | 5/2000 | Shu |
| 6,059,254 A | 5/2000 | Sundet et al. |
| 6,067,011 A | 5/2000 | Leslie |
| 6,067,525 A | 5/2000 | Johnson et al. |
| 6,105,437 A | 8/2000 | Klug et al. |
| 6,111,888 A | 8/2000 | Green et al. |
| 6,115,831 A | 9/2000 | Hanf et al. |
| 6,123,585 A | 9/2000 | Hussong et al. |
| 6,131,467 A | 10/2000 | Miyano et al. |
| 6,140,952 A | 10/2000 | Gaboury |
| 6,151,557 A | 11/2000 | Broden et al. |
| 6,175,770 B1 | 1/2001 | Bladow |
| 6,177,877 B1 | 1/2001 | Munyon |
| D439,177 S | 3/2001 | Fandrey et al. |
| D439,178 S | 3/2001 | Fandrey et al. |
| D439,179 S | 3/2001 | Fandrey et al. |
| D439,180 S | 3/2001 | Fandrey et al. |
| D439,181 S | 3/2001 | Fandrey et al. |
| 6,216,172 B1 | 4/2001 | Kolblin et al. |
| 6,219,876 B1 | 4/2001 | Blum |
| D441,672 S | 5/2001 | Fandrey et al. |
| 6,233,532 B1 | 5/2001 | Boudreau et al. |
| 6,267,010 B1 | 7/2001 | Hatanaka et al. |
| 6,285,964 B1 | 9/2001 | Babel et al. |
| 6,295,875 B1 | 10/2001 | Frick et al. |
| 6,298,454 B1 | 10/2001 | Schleiss et al. |
| 6,311,568 B1 | 11/2001 | Kleven |
| 6,321,166 B1 | 11/2001 | Evans et al. |
| 6,370,020 B1 | 4/2002 | Toukairin ..................... 361/681 |
| 6,415,188 B1 | 7/2002 | Fernandez et al. |
| 6,421,570 B1 | 7/2002 | McLaughlin et al. |
| 6,457,367 B1 | 10/2002 | Behm et al. |
| 6,460,094 B1 | 10/2002 | Hanson et al. |
| 6,484,107 B1 | 11/2002 | Roper et al. |
| 6,487,912 B1 | 12/2002 | Behm et al. |
| 6,504,489 B1 | 1/2003 | Westfield et al. |
| 6,510,740 B1 | 1/2003 | Behm et al. |
| 6,511,337 B1 | 1/2003 | Fandrey et al. |
| 6,516,672 B2 | 2/2003 | Wang |
| D471,829 S | 3/2003 | Dennis et al. |

| | | | |
|---|---|---|---|
| D472,831 S | 4/2003 | Dennis et al. | |
| 6,546,805 B2 | 4/2003 | Fandrey et al. | |
| 6,568,279 B2 | 5/2003 | Behm et al. | |
| 6,571,132 B1 | 5/2003 | Davis et al. | |
| 6,593,857 B1 | 7/2003 | Roper et al. | |
| 6,609,427 B1 | 8/2003 | Westfield et al. | |
| 6,662,662 B1 | 12/2003 | Nord et al. | |
| 6,701,274 B1 | 3/2004 | Eryurek et al. | |
| 6,765,968 B1 | 7/2004 | Nelson et al. | |
| 6,898,980 B2* | 5/2005 | Behm et al. | 73/756 |
| 7,109,883 B2* | 9/2006 | Trimble et al. | 340/870.16 |
| 7,134,354 B2 | 11/2006 | Nelson et al. | |
| 2002/0108448 A1 | 8/2002 | Behm et al. | |
| 2003/0020456 A1 | 1/2003 | Ayo et al. | |
| 2003/0210375 A1 | 11/2003 | Sikharulidze | |
| 2004/0104889 A1* | 6/2004 | Fehrenbach et al. | 345/156 |
| 2004/0144953 A1 | 7/2004 | Sikharulidze | |
| 2004/0185185 A1 | 9/2004 | Kitson et al. | |
| 2004/0217877 A1 | 11/2004 | Kokonaski et al. | |
| 2005/0056106 A1 | 3/2005 | Nelson et al. | |
| 2005/0094073 A1 | 5/2005 | Sikharulidze | |
| 2005/0206831 A1 | 9/2005 | Sikharulidze | |
| 2006/0044700 A1 | 3/2006 | Paul et al. | |
| 2006/0128199 A1* | 6/2006 | Hedtke | 439/320 |
| 2007/0115083 A1 | 5/2007 | Franke et al. | |
| 2007/0268153 A1 | 11/2007 | Gansen | |

FOREIGN PATENT DOCUMENTS

| | | |
|---|---|---|
| CN | 101432596 A | 5/2009 |
| DE | 3741648 A1 | 7/1988 |
| DE | 4020318 A1 | 1/1991 |
| DE | 19745244 A1 | 4/1998 |
| DE | 2990260 U1 | 5/2000 |
| DE | 10393266 T5 | 8/2005 |
| EP | 0063685 A1 | 10/1982 |
| EP | 0167941 A2 | 1/1986 |
| EP | 0214801 A1 | 3/1987 |
| EP | 0223300 A2 | 5/1987 |
| EP | 0268742 A1 | 6/1988 |
| EP | 0639039 A1 | 2/1995 |
| EP | 0903651 A1 | 3/1999 |
| EP | 1586875 A1 | 10/2005 |
| GB | 2190944 A | 12/1987 |
| GB | 9109176.4 U1 | 10/1991 |
| JP | 54143248 A | 11/1978 |
| JP | 63124916 A | 5/1988 |
| JP | 401313038 A | 12/1989 |
| JP | 06133850 A | 5/1994 |
| JP | 08292438 A | 11/1996 |
| JP | 10009938 A | 1/1998 |
| JP | 2000121470 A | 4/2000 |
| JP | 2000314786 A | 11/2000 |
| JP | 2000321160 A | 11/2000 |
| JP | 2002040168 A | 2/2002 |
| JP | 2009509673 T | 3/2009 |
| RU | 2300082 C2 | 5/2007 |
| WO | WO 8801417 A1 | 2/1988 |
| WO | WO 8902578 A1 | 3/1989 |
| WO | WO 8904089 A1 | 5/1989 |
| WO | WO 9015975 A1 | 12/1990 |
| WO | WO 9118266 A1 | 11/1991 |
| WO | WO 9634264 A1 | 10/1996 |
| WO | WO 9848489 A1 | 10/1998 |
| WO | WO 0023776 A1 | 4/2000 |
| WO | WO 0175675 A1 | 10/2001 |
| WO | WO 2004023080 A1 | 3/2004 |
| WO | WO 2006004470 A1 | 1/2006 |
| WO | 2006044700 A2 | 4/2006 |
| WO | WO2007/090421 | 8/2007 |
| WO | WO 2007130426 A1 | 11/2007 |

OTHER PUBLICATIONS

"A Systems Approach," Dr. C. Ikoku, *Natural Gas Engineering*, PennWell Books, (undated) pp. 256-257.

"Bosch CAN Specification Version 2.0", by Robert Bosch GmbH, pp. 1-68 including pp. -1- and -2-, (Sep. 1991).

"Claudius Ptolemy (100?-170? AD)", *M&C News*, 7 pages, (Apr. 1994).

"Development of an Integrated EFM Device for Orifice Meter Custody Transfer Applications," S.D. Nieberle et al., *American Gas Association Distribution/Transmission Conference & Exhibit*, May 19, 1993.

"Flow Measurement," *Handbook of Fluid Dynamics*, V. Streeter, Editor-in-chief, published by McGraw-Hill Book Company, Inc. 1961, pp. 14-4 to 14-15.

"Hydrostatic Tank Gauging—Technology Whose Time Has Come," J. Berto, *Rosemount Measurement Division Product Feature*, undated reprint from *INTECH*.

"Low Cost Electronic Flow Measurement System," *Tech Profile*, May 1993, Gas Research Institute, Chicago, IL.

"Methods for Volume Measurement Using Tank-Gauging Devices Can Be Error Prone," F. Berto, *The Advantages of Hydrostatic Tank Gauging Systems*, undated reprint from *Oil &Gas Journal*.

"MicroLAN Design Guide", Dallas Semiconductor, Tech Brief No. 1, (undated).

"Notification of Transmittal of the International Search Report or Declaration" for International application Serial No. PCT/US00/26561.

"Notification of Transmittal of the International Search Report or Declaration" for International application Serial No. PCT/US00/26488.

"Notification of Transmittal of the International Search Report or Declaration" for International application Serial No. PCT/US00/26563.

"Notification of Transmittal of the International Search Report or Declaration" for International application Serial No. PCT/US01/13993.

"Notification of Transmittal of the International Search Report or Declaration" for International application Serial No. PCT/US01/14521.

"Notification of Transmittal of the International Search Report or Declaration" for International application Serial No. PCT/US03/27096.

"Notification of Transmittal of the International Search Report or Declaration" for International application Serial No. PCT/US01/010580.

"Precise Computerized In-Line Compressible Flow Metering," *Flow—Its Measurement and Control in Science and Industry*, vol. 1, Part 2, Edited by R. Wendt, Jr., Published by American Institute of Physics et al, (undated) pp. 539-540.

"Pressure Sensors Gauge Tank Level and Fluid Density," *Rosemount Measurement Division Product Feature*, undated reprint from *Prepared Foods* (Copyrighted 1991 by Gorman Publishing Company).

"Rosemount Model 8732C Magnetic Flowmeter Transmitter", by Rosemount Inc., Eden Prairie, Minnesota, (1998).

"Single Chip Senses Pressure and Temperature," *Machine Design*, 64 May 21, 1992, No. 10.

"Smart Transmitters Tear Up the Market," C. Polsonetti, *INTECH*, Jul. 1993, pp. 42-45.

"The Digitisation of Field Instruments" W. Van Der Bijl, *Journal A*, vol. 32, No. 3, 1991, pp. 62-65.

2 pages downloaded from http://www.interlinkbt.com/PRODUCT/IBT_PROD/DN/CN-DM_PN/EURO-DP.HTM dated Sep. 15, 2000.

3 pages from Turk Cable Standards, by Turk, Inc., Minneapolis, Minnesota.

4 pages downloaded from http://www.interlinkbt.com/PRODUCT/IBT_PROD/dn/EUR-CON/euro-fwc.htm dated Sep. 15, 2000.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering*, Dec. 1992, Bristol Babcock, Inc., Watertown, CT 06795.

American National Standard, "Hydraulic Fluid Power-Solenoid Piloted Industrial Valves—Interface Dimensions for Electrical Connectors", National Fluid Power Association, Inc., 10 pages, (Aug. 1981).

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.

Product Data Sheet No. 00813-0100-4001, "Model 3051 Digital Pressure Transmitter for Pressure, Flow, and Level Measurement", by Rosemount Inc., Eden Prairie, Minnesota, (1998).

Product Data Sheet No. 00813-0100-4003, "Model 8800A", by Rosemount Inc., Eden Prairie, Minnesota, (1998).

Product Data Sheet No. 00813-0100-4263, "Model 444 Alphaline® Temperature Transmitters", by Rosemount Inc., Eden Prairie, Minnesota, (1997).

Product Data Sheet No. 00813-0100-4360, "Model 1151 Alphaline® Pressure Transmitters", by Rosemount Inc., Eden Prairie, Minnesota, (1998).

Product Data Sheet No. 00813-0100-4378, "Model 751 Field Signal Indicator", by Rosemount Inc., Eden Prairie, Minnesota, (1997).

Product Data Sheet No. 00813-0100-4458, "Model 1135F Pressure-to-Current Converter", by Rosemount Inc., Eden Prairie, Minnesota, (1983, 1986, 1994).

Product Data Sheet No. 00813-0100-4592, "Model 2024 Differential Pressure Transmitter", by Rosemount Inc., Eden Prairie, Minnesota, (1987-1995).

Product Data Sheet No. 00813-0100-4640, "Model 3201 Hydrostatic Interface Unit", from the Rosemount Comprehensive Product Catalog, published 1998, by Rosemount Inc., Eden Prairie, Minnesota.

Product Data Sheet No. 00813-0100-4690, "Model 2088 Economical Smart Pressure Transmitter", by Rosemount Inc., Eden Prairie, Minnesota, (1998).

Product Data Sheet No. 00813-0100-4698, "Model 2090F Sanitary Pressure Transmitter", by Rosemount Inc., Eden Prairie, Minnesota, (1998).

Product Data Sheet No. 00813-0100-4724, "Models 3144 and 3244MV Smart Temperature Transmitters", by Rosemount Inc., Eden Prairie, Minnesota, (1998).

Product Data Sheet No. 00813-0100-4731, "APEX™ Radar Gauge", by Rosemount Inc., Eden Prairie, Minnesota, (1998).

Product Data Sheet No. 00813-0100-4738, "Model 3095FB Multivariable™ Transmitter with Modbus™ Protocol", by Rosemount Inc., Eden Prairie, Minnesota, (1996, 1997).

Product Data Sheet No. 00813-0100-4769, "Model 3244MV Multivariable Temperature Transmitter with FOUNDATION™ Fieldbus", by Rosemount Inc., Eden Prairie, Minnesota, (1998).

Product Data Sheet No. 00813-0100-4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.

Product Data Sheet PDS 4638, "Model 3001CL Flush-Mount Hydrostatic Pressure Transmitter," Jul. 1992, Rosemount Inc., Eden Prairie, MN 55344.

Product Data Sheet PDS 4640, "Model 3201 Hydrostatic Interface Unit," Mar. 1992, Rosemount Inc., Eden Prairie, MN 55344.

Specification Summary, "AccuRate Advanced Gas Flow Computer, Model GFC 3308," (undated) Bristol Babcock, Inc., Watertown, CT, 06795.

Specification Summary, "TELETRANS™ 3508-10A Smart Pressure Transmitter," (undated) Bristol Babcock, Inc., Watertown, CT, 06795.

Specification Summary, "TELETRANS™ 3508-30A Smart Differential Pressure Transmitter," (undated) Bristol Babcock, Inc., Watertown, CT, 06795.

Technical Information Bulletin, "Liquid Level Transmitter Model DB40RL Sanitary Sensor *deltapilot*," Endress + Hauser, Greenwood, Indiana, Sep. 1992, pp. 1-8.

"HP Labs demos plastic LCDs", L. Sherriff, published Oct. 19, 2004; http://www.theregister.co.uk/2004/10/19/plastic_lcd/.

"HP researchers show prototype of printed, plastic, color display", Oct. 2004; http://www.hpl.americas.hp.net/news/2004/oct_dec/bistable_display.html.

"HP offers peek at future computer monitors", Scarlet Pruitt, Oct. 19, 2004; http://www.computerworld.com/hardwaretopics/hardware/story/0,10801,96779,00.html?nas=AM-96779.

"HP offers peek at future of large, plastic displays", IDG News Service Oct. 19, 2004, http://www.itworld.com/Comp/1874/041019hpdisplay/pfindex.html.

"Plastic technologies go on display", Jan. 2005, http://www.cieonline.co.uk/cie2/articlen.asp?pid=480&id=5110.

"New display 'as clear as a glossy magazine'", Exclusive from New Scientist Print Edition, Barry Fox, http://www.newscientist.com/article.ns?id=dn6557.

\* cited by examiner

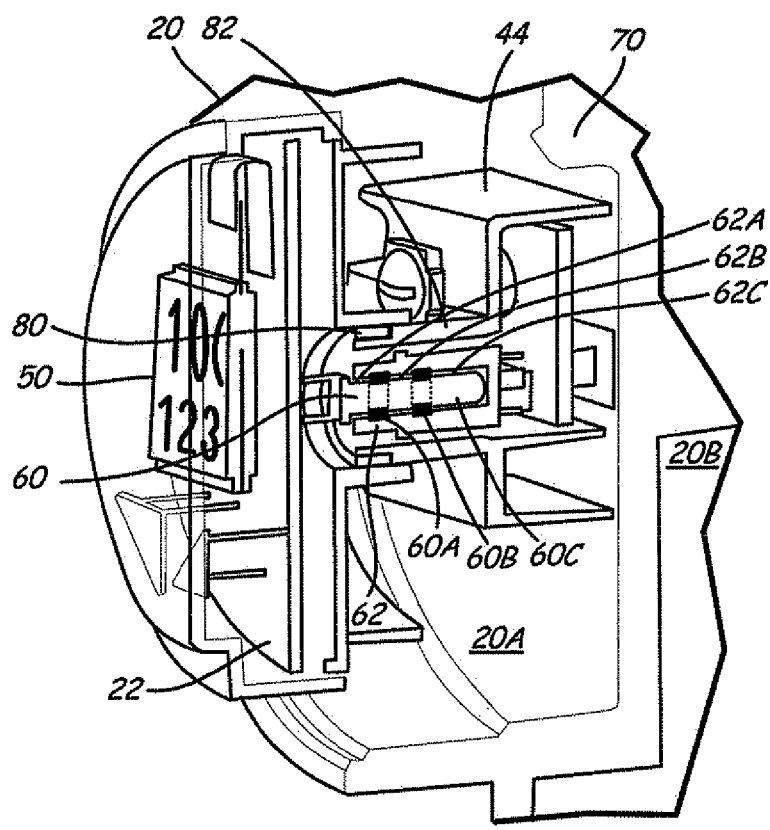
FIG. 3
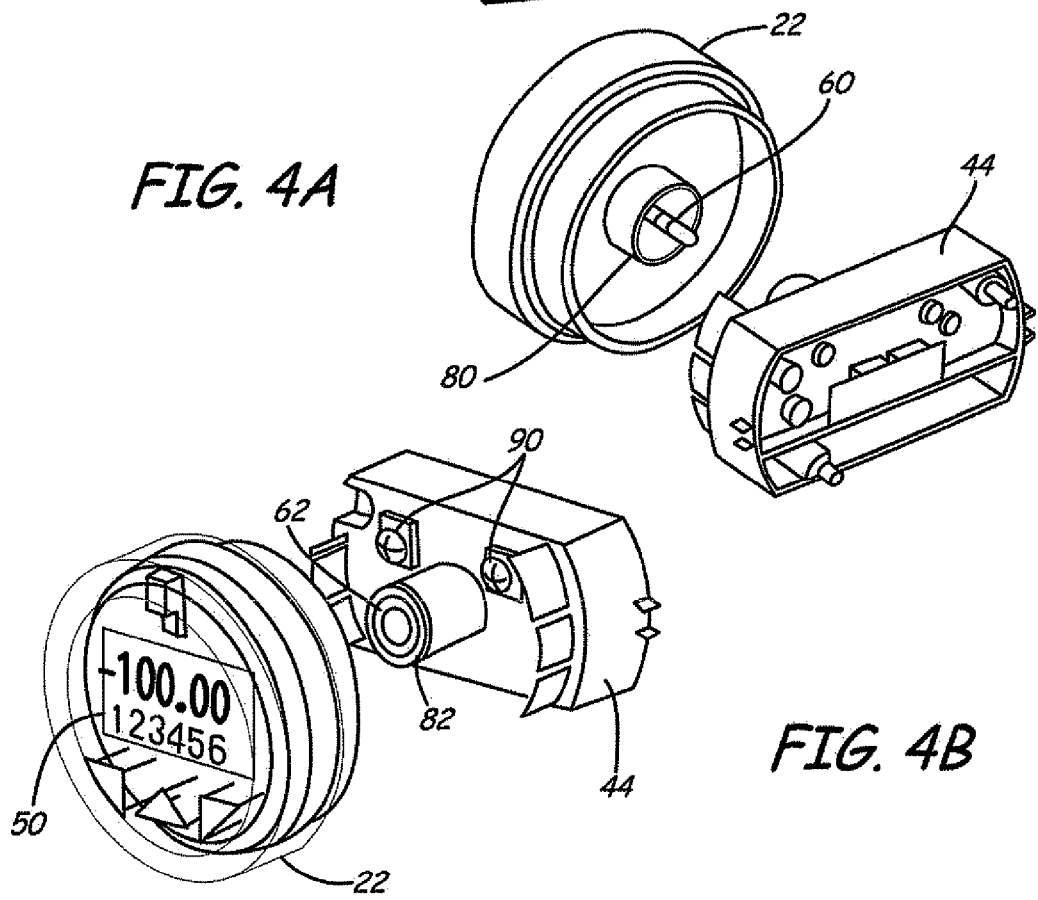
FIG. 4A
FIG. 4B

PROCESS VARIABLE TRANSMITTER WITH DISPLAY

BACKGROUND OF THE INVENTION

The present invention relates to industrial process control transmitters of the type used in industrial process or monitoring systems. More specifically, present invention relates to industrial process control transmitters which include display.

Industrial process control transmitters are used in industrial processes to measure a process variable. Examples of process variables include temperature, pressure, flow rate, level, pH, etc. Typically, the process control transmitters are located at a remote locations and sends information to a centralized location such as a control room. Some industrial process control transmitters also include a local display for displaying information on the transmitters.

In many instances, process control transmitters are located in harsh environments. The display must be coupled to a circuitry in the process variable transmitter in a manner which is appropriate for use in such environments.

SUMMARY

A process variable transmitter having a display for use in measuring a process variable of an industrial process includes a display. The transmitter comprises a housing, a process variable sensor configured to sense the process variable of the industrial process, transmitter circuitry coupled to the process variable sensor configured to provide a transmitter output and a connection member in the housing configured to couple to the transmitter circuitry. A first rotatable connector on the connection member includes a plurality of first conductors. A display includes a second rotatable connector having a plurality of second conductors. The plurality of first and second conductors are configured to electrically connect together.

BRIEF DESCRIPTION OF THE DRAWINGS

FIG. 3 is a partial cross sectional view of the transmitter of FIG. 1 showing a display.

FIGS. 4A and 4B are back and front exploded perspective views, respectively, of the display of FIG. 3.

DETAILED DESCRIPTION

Figure 1:
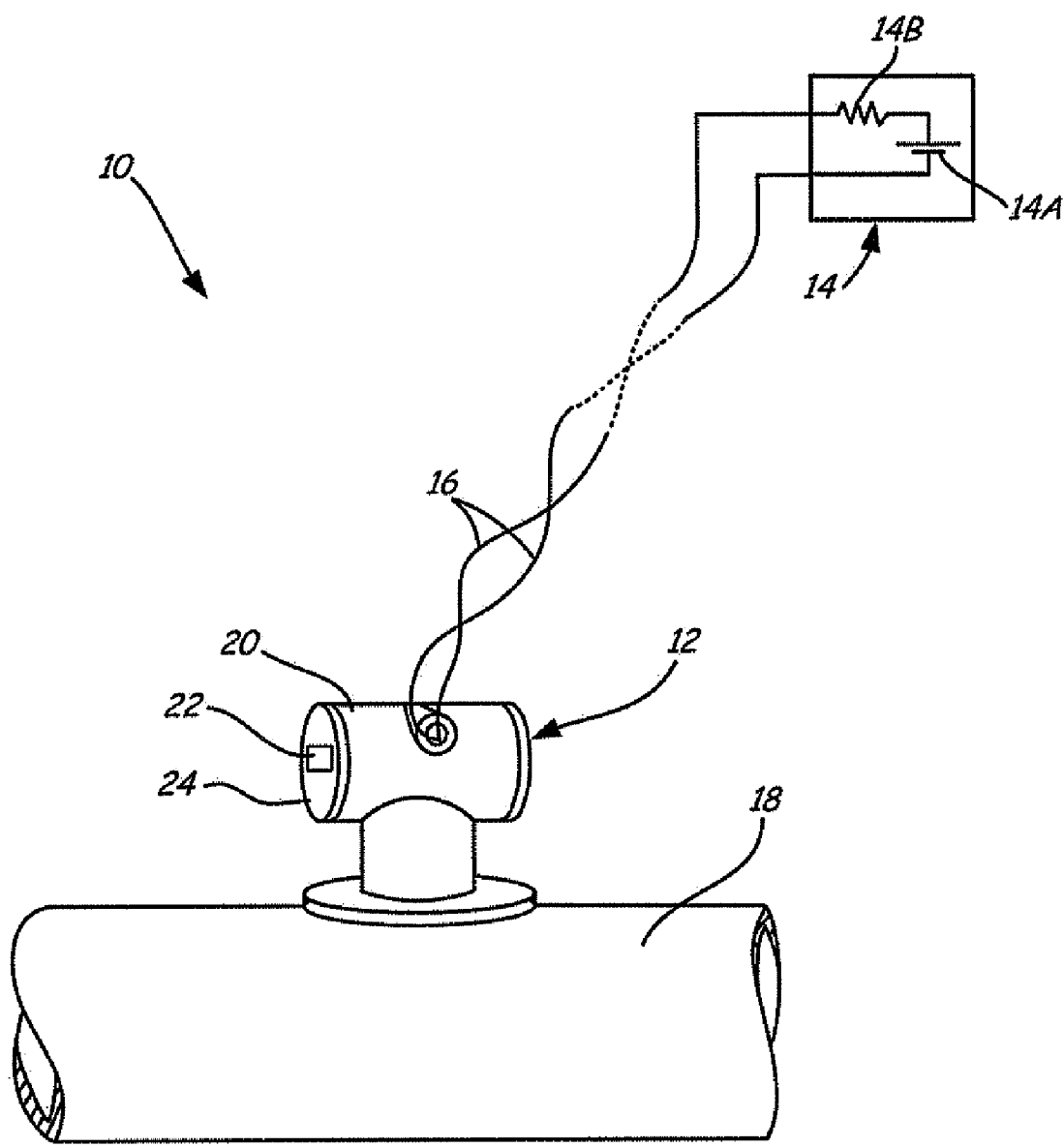
FIG. 1 is a simplified diagram of an industrial process including a process variable transmitter in accordance with the present invention.

The present invention provides a process variable transmitter including a display for displaying information locally. The transmitter is configured to transmit information to a local location such as a control room, while the transmitter itself is located remotely. FIG. 1 is a simplified diagram showing an industrial process control or monitoring system 10 for use in monitoring or controlling a process fluid in an industrial process. In FIG. 1, a transmitter 12 is shown as being coupled to control room 14 by two wire process control loop 16. However, other communication techniques can be employed such as wireless techniques, other wiring configurations, etc. Typical two wire process control loops include 4-20 mA control loops which may carry digital information, in addition to, or as an alternative to, analog data carried as an analog current representation. Process control room 14 is illustrated as a power supply (voltage source) 14A and a resistance 14B. The same two wire process control loop can also be used as the sole source of power for electrical circuitry in the transmitter 12. Additionally, the communication may be over a wireless process control loop in which information is transmitted wirelessly using, for example, RF communication techniques. The process variable transmitter 12 is shown coupled to process piping 18 and is configured, in this embodiment, to measure a process variable of a process fluid in piping 18. Example process variables include temperature, pressure, flow, level, etc.

Process variable transmitter 12 includes a housing 20 which is configured to enclose circuitry of transmitter 12. Transmitter 12 also includes a display module 22 which is sealed within housing 20 by an end cap 24. In the configuration shown in FIG. 1, the process variable transmitter housing 20 has a cylindrical shape such that the end cap 24 is circular and can be threadably coupled to housing 20.

Figure 2:
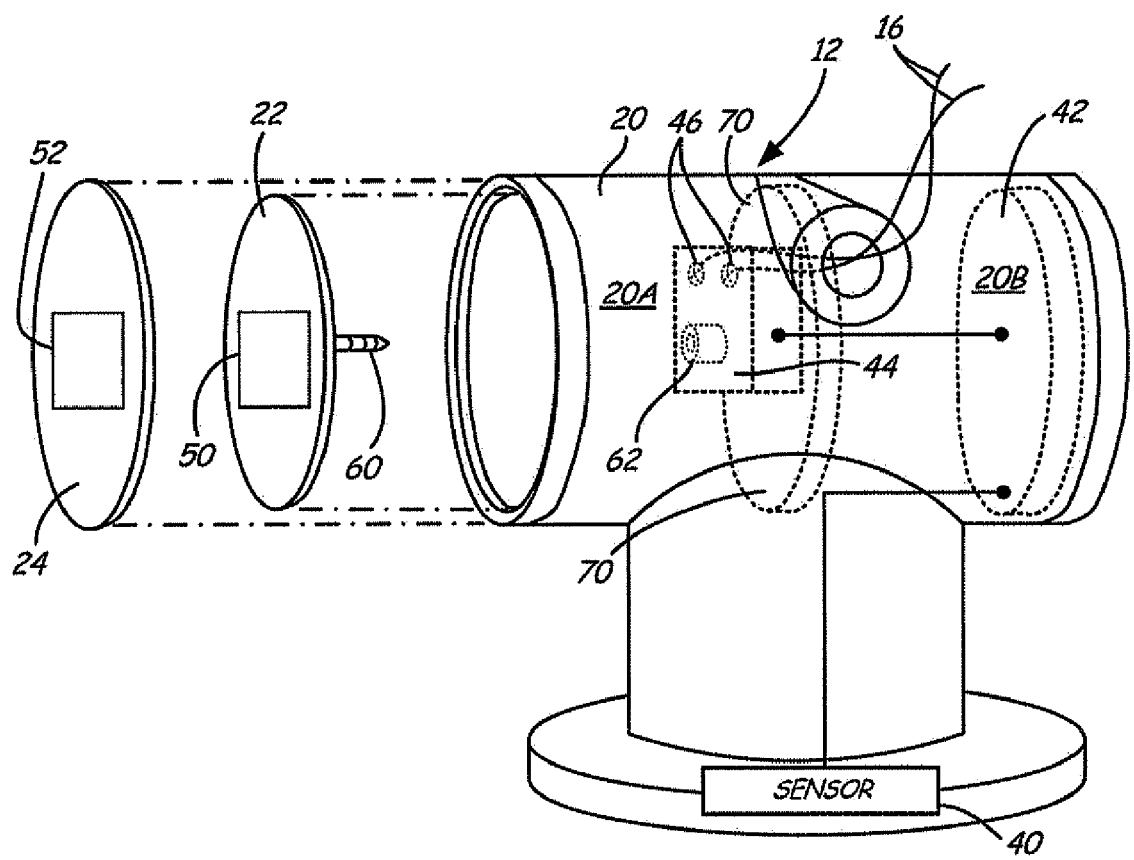
FIG. 2 is an exploded view of the process variable transmitter of FIG. 1.

According to the embodiments, FIG. 2 is an exploded view of process variable transmitter 12 illustrating display or showing display module 22 and end cap 24. As illustrated in FIG. 2, process variable transmitter 12 includes a process variable sensor 40 which is configured to sense a process variable of a process fluid. Measurement circuitry 42 in the transmitter 12 couples to the process variable sensor 40 and is configured to provide an output to a terminal block 44 in housing 20. Terminal block 44 includes connectors 46 which are coupled to two wire process control loop 16. Measurement circuitry 42 can be configured to transmit information over two wire process control loop 16 which is related to the sensed process variable. Although a two wire process variable loop is shown, any appropriate process control loop may be used including, a wireless communication technique.

As illustrated in FIG. 2, display module 22 comprises a circuit board or the like which carries a display 50 thereon. Display 50 can use any appropriate display technology, for example, LCD components, LED elements, etc. The display 50 can be aligned with a window 52 located in end cap 24 whereby display 50 is visible therethrough. Display module 22 includes a circular connector 60 which is configured to couple to a circular connector 62 in terminal block 44. As described below in greater detail, connectors 60 and 62 can be sealed when they are coupled together. Display module 22 is rotatable about terminal block 44 at the connectors 60 and 62. In this configuration element 60 is shown as a protruding or elongate post or pin and element 62 is illustrated as a socket or receptacle configured to receive the post.

During operation, it is possible for moisture to enter the housing 20. More specifically, the housing 20 includes two portions. Portion 20A may be exposed to moisture or other elements from the environment. However, portion 20B is sealed by internal wall 70 which carries terminal block 44 positioned in portion 20A.

Process control loop 16 is illustrated as a two wire process control loop. However, any appropriate loop technology may be used including wireless techniques. For a two wire process control loop, the circuitry in the process variable transmitter 12 may be powered with power received from loop 16. The loop 16 can also be used to communicate information, for example, as loop 16 can carry an analog current representation of a sensed process variable. Circuitry in transmitter 12 can control the loop current, for example between 4 and 20 mA, to thereby represent the sensed process variable. Digital data can also be modulated on the current and used to communicate with circuitry in the control room 14. Example communication techniques include HART® communication protocol, FieldBus communication protocols, or others. As discussed above, such techniques include wireless communication techniques.

In typical prior art designs, the display module 22 is electrically coupled to terminal block 44 using a multi-pin electrical connector and a respective socket. However, providing a seal to such a configuration and the ability to rotate the display module 22 requires multiple pins and receptacles at various orientations and locations. Further, it is difficult to seal the electrical connection from the environment. According to one embodiment of the invention, FIG. 3 is a cutaway view of a portion of the process variable transmitter 12 showing display module 22 coupled to terminal block 44 in housing 20. As illustrated in FIG. 3, connector 60 is an elongate connector having multiple electrical conductors 60A, 60B and 60C and connector 62 is illustrated as a receptacle having multiple conductors 62A, 62B and 62C configured to mate with the respective conductors on connector 60. As illustrated in FIG. 3, a display seal 80 is configured to mate with a terminal block seal 82 to thereby seal connectors 60 and 62. Note that both connectors 60 and 62 have round or circular cross sections such that the display module 22 may be rotated relative to terminal block 44 about the connectors 60 and 62.

FIGS. 4A and 4B are front exploded and rear exploded perspective views of display module 22 and terminal block 44. FIGS. 4A and 4B illustrate connectors 60 and 62 and their respective seals 80 and 82. FIG. 4A also illustrates terminals 90 which couple to two wire control process control loop shown in FIGS. 1 and 2.

In one configuration, connectors 60 and 62 each include three separate electrical contacts or conductors. These contacts are used to provide information to and control of display 50 by measurement circuitry 42. For example, this can provide a local display to an operator related to the sensed process variable, diagnostic information, calibration information, etc. Any number of electrical contacts can be used as desired. Each of the contacts in the respective connectors 60/62 are separated by an insulator to prevent short circuiting. With this configuration, the display module 22 can be easily rotated relative to terminal block 44 to achieve a desired orientation. The seals 80 and 82 can be fabricated using any appropriate materials such as a slightly elastic material, for example, rubber, plastic or the like, and should be configured to tightly fit against one another to provide the desired seal.

Figure 5:
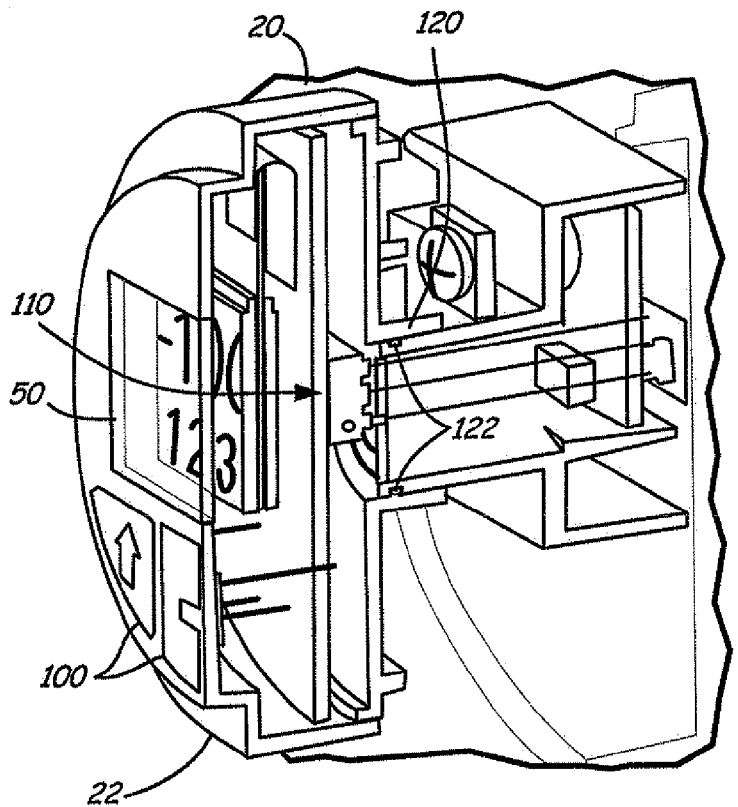
FIG. 5 is a cross sectional view of a display in accordance with another embodiment.
Figure 6A:
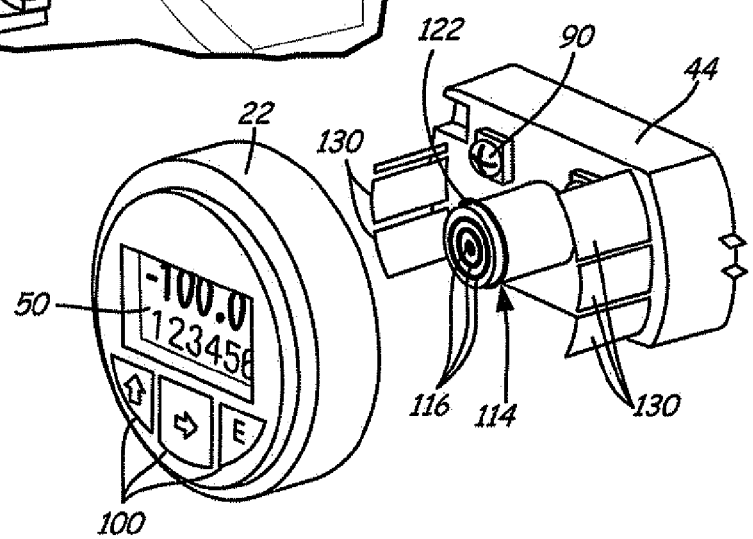
FIGS. 6A and 6B are front and back exploded perspective views, respectively, of the display of FIG. 5.
Figure 6B:
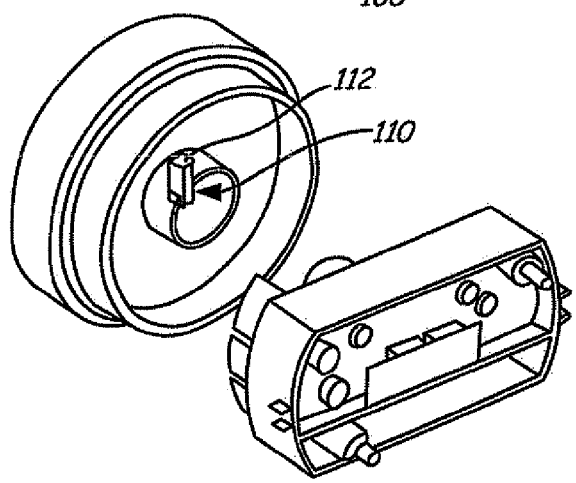

FIG. 5 is a cross sectional view of display module 22 and terminal block 44 showing another example configuration of the connectors of the present invention. FIGS. 6A and 6B are front and back exploded perspective views, respectively, of the configuration. In FIGS. 5, 6A and 6B, the display module 22 includes a connector 110 which comprises a plurality of spring loaded conductors 112. These conductors 112 are arranged to mate to electrical conductors 116 of connector 114 on terminal block 44. These Figures also illustrate seals 120 and 122 which comprise a circular flange and an O-ring, respectively. The O-ring seal 122 fits inside the circular flange to thereby seal connectors 110 and 114 from the environment. As discussed in connection with the previous embodiment, the individual conductors 112 and 116 are separated by electrical insulators and any number of connectors may be employed as desired. In these embodiments, display module 22 is illustrated as including buttons 100 for providing a user input in addition to the display 50. Operation of buttons 100 can be monitored by measurement circuitry 42 shown in FIG. 2 through the electrical conductors 112/116. With this configuration, the display module 22 can be rotated to relative to terminal block 44 as desired while also providing a configuration which can be easily sealed from the environment.

Although the present invention has been described with reference to preferred embodiments, workers skilled in the art will recognize that changes may be made in form and detail without departing from the spirit and scope of the invention. As used herein, "circular connectors" refers to the connectors shown in FIGS. 3, 4A, 4B, 5, 6A and 6B, although the individual conductors may not be circular in some configurations. For example, in the example of connectors 110 and 114, the connectors themselves are circular with the included flange or seal 120. Such connectors may also be referred to as "rotatable". Although only two example configurations are shown herein, the present invention is not limited to these configurations and any connector which allows rotation for multiple electrical connections may be employed. In one embodiment, the rotation comprises continuous rotation. The display module 22 may include additional components to secure the display module 22 to the terminal block 44. For example, FIG. 6A shows flanges 130 which can press against an outer circumference of display module 22. The rotatable connector can be on either side of the wall of the terminal block and is not limited to the configuration shown here. Although a terminal block is specifically shown, the display can couple to any connection member.

What is claimed is:

1. A process variable transmitter having a display for use in measuring a process variable of an industrial process, comprising:
   a housing having an internal wall which divides an internal cavity of the housing into a first portion which may be exposed to an environment and a sealed portion;
   a process variable sensor configured to sense the process variable of the industrial process;
   transmitter circuitry in the second portion of the housing coupled to the process variable sensor configured to provide a transmitter output;
   a terminal block in the first portion of the housing configured to couple to the transmitter circuitry through the internal wall, the terminal block mounted on the internal wall;
   a first rotatable connector on the connection member including a plurality of first conductors, the first rotatable connector mounted on the terminal block and located in the first portion; and
   a display module having a display thereon and a second rotatable connector having a plurality of second conductors coupled to the display, the plurality of first conductors configured to electrically connect to the plurality of second conductors, wherein the display module is rotatable about the connection member at the first and second connectors and the display module is located in the first portion.

2. The process variable transmitter of claim 1 wherein at least one of the first and second rotatable connectors comprises a protruding post and another of the first and second rotatable connectors comprises a socket configured to receive the protruding post.

3. The process variable transmitter of claim 2 wherein the plurality of conductors of the post comprises a plurality of longitudinal spaced conductors separated by an insulator.

4. The process variable transmitter of claim 1 including a seal extending around the first and second rotatable connectors.

5. The process variable transmitter of claim 1 wherein the terminal block includes connectors configured to couple to a two wire process control loop.

6. The process variable transmitter of claim 1 wherein at least one of the first and second rotatable connectors comprises a plurality of concentric conductive rings and another of the first and second conductors comprises a plurality of radially spaced electrical contacts configured to electrically connect to the plurality of conductive rings.

7. The process variable transmitter of claim 1 wherein the display module includes an input configured to receive a manual input.

8. The process variable transmitter of claim 7 wherein the first rotatable connector is electrically connected to the input through the second rotatable connector.

9. A method in a process variable transmitter of the type used in an industrial process for coupling a display to a terminal block comprising:

placing the terminal block in the first portion of the housing;

providing an inner wall in the housing which defines a first portion which may be exposed to an environment and a second sealed portion;

sensing a process variable using a process variable sensor;

receiving the process variable from the process variable sensor using measurement circuitry in the second portion of the housing and responsibly providing a transmitter output;

providing a first rotatable connector on the terminal block which includes a plurality of conductors;

mounting the terminal block to the inner wall and located in the first portion;

providing a display in the first portion having a display element carried thereon and a second rotatable connector having a plurality of second conductors;

connecting the first rotatable connector to the second rotatable connector to thereby provide an electrical connection between the first and second electrical conductors; and placing an end cap on the housing.

10. The method of claim 9 wherein at least one of the first and second rotatable connectors comprises a protruding post and another of the first and second rotatable connectors comprises a socket configured to receive the protruding post.

11. The method of claim 10 wherein the plurality of conductors of the post comprises a plurality of longitudinal spaced conductors separated by an insulator.

12. The method of claim 9 including a seal extending around the first and second rotatable connectors.

13. The method of claim 9 wherein the terminal block is configured to couple to a two wire process control loop.

14. The method of claim 9 wherein at least one of the first and second rotatable connectors comprises a plurality of concentric conductive rings and another of the first and second conductors comprises a plurality of radially spaced electrical contacts configured to electrically connect to the plurality of conductive rings.

15. The method of claim 9 wherein the display module includes an input configured to receive a manual input.

16. The method of claim 15 wherein the first rotatable connector is electrically connected to the input through the second rotatable connector.

* * * * *